Nov. 7, 1950          R. S. HART          2,529,080
CONTACTOR
Filed Feb. 17, 1948
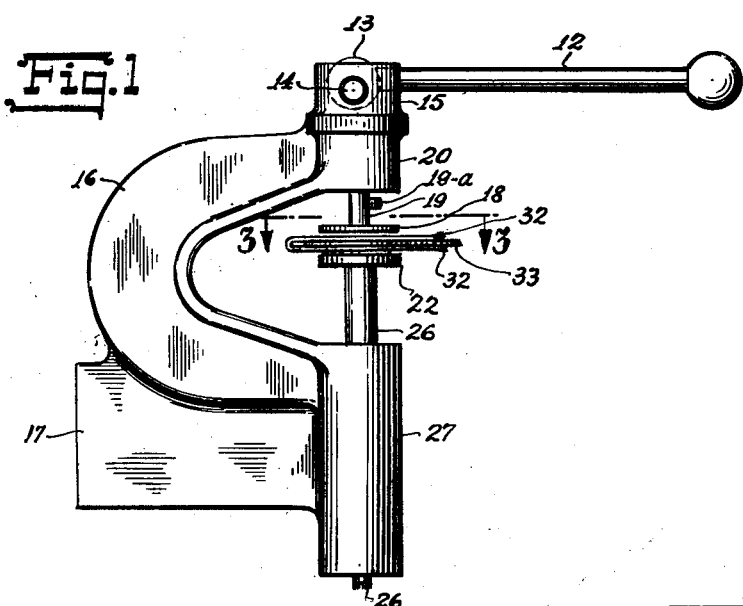
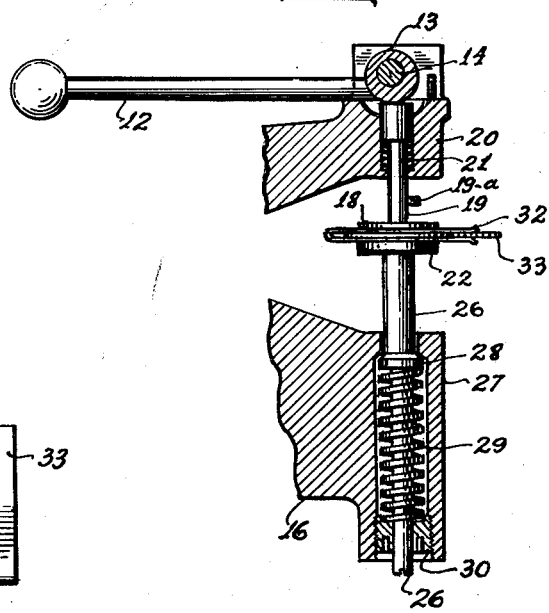
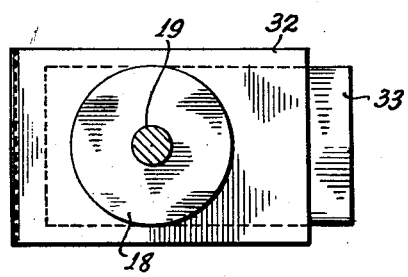
INVENTOR.
RAYMOND S. HART
BY *M. Bjorndal*
ATTORNEY Patented Nov. 7, 1950

2,529,080

UNITED STATES PATENT OFFICE 2,529,080

CONTACTOR

Raymond S. Hart, Brooklyn, N. Y.

Application February 17, 1948, Serial No. 8,993

1 Claim. (Cl. 175—183)

This invention relates to improvements in contactors for moisture meters and particularly it refers to a contactor for the measurement of moisture in paper or other fibrous sheets.

Due to the requirements for more and more uniform materials in recent years the accurate determination of moisture in various industrial products has become increasingly important. This is particularly true in the case of paper and a great deal of research and instrumentation has been necessary to obtain this object. The conductive method of measuring moisture in paper has become standard in the industry and has facilitated and simplified moisture tests to a point where a large number of readings can be taken in a short time and with great accuracy of result. In such measurements it is necessary to measure resistance as high as 500,000 megohms and any leakage due to surface moisture on insulators, etc. will play havoc with the results. Any leakage usually occurs across the resistance to be measured thereby shunting same and inasmuch as the leakage is often of the same order of resistance as the one under test, the result is that the reading will be only half of what it should be. For this reason, it has been found necessary to use a comparison method where fixed resistors in the instrument represent various percentages of moisture in a given paper. It is, therefore, important to eliminate the leakage resistance and this has been attained in the present contactor where the paper to be measured furnishes the only insulation between the two polarities of the instrument. In this manner, the leakage path is the actual resistance path to be measured, thereby greatly increasing the accuracy of the reading. A meter supplied with the present contactor will always give reliable readings once it has been calibrated for a certain paper. An important object of my invention is to provide a contactor where no insulation is necessary except the paper to be measured.

Another object of my invention is to provide a simple and effective contactor which can be manufactured at low cost and which can be relied upon to give long and satisfactory service in the field.

Other objects and advantages of the invention will be apparent in the course of the following description.

In the accompanying drawings, forming a part of this specification and in which like numerals are employed to designate like parts throughout the same, Figure 1 is a side elevation of a contactor embodying my invention;

Figure 2 is a partial sectional elevation to the contactor mechanism in its closed position; and Figure 3 is a section taken along line 3—3 in Figure 1.

In the drawings, wherein for the purpose of illustration is shown a preferred embodiment of my invention, the numeral 12 designates the handle of the contactor which terminates in a cam 13. The cam 13 is eccentrically mounted on shaft 14, and the shaft 14 is journalled in the bearing lugs 15 of the contactor yoke 16. The contactor yoke 16 has a mounting plate 17 by which it may be mounted upon the instrument or on any other suitable support.

The contactor elements consist of the upper contact plate 18, which is fastened to the plunger 19 by means of a set screw or pin 19A. The plunger 19 has an enlarged portion at its upper end which is working against the precision spring 21 placed in the recess in the head 20 of the contactor. The enlarged portion of plunger 19 is hardened and has contact with the surface of the cam 13 which also is hardened and the eccentricity of the cam 13 will cause the plunger 19 to move up or down as the handle 12 is swung throughout 180 degrees from the open position as shown in Figure 1 to the closed position as indicated in Figure 2.

The spring 21 serves to push the plunger 19 up against the cam 13 thus binding the contactor with the cam 30 in the position indicated in Figure 1.

The lower part of the contactor consists of the contact plate 22 which is mounted upon the plunger 26. This plunger 26 has a collar 28 and a screen of smaller diameter extending through the spring housing 27 of the contactor body 16. A heavy coil spring 29 is placed over the diameter of plunger 26 between the collar 28 and a screw plug 30 which closes the lower binding of the spring housing 27. The plunger 26 with the contactor plate 22 is thus free to move vertically downward against the pressure of the coil spring 29. The collar 28 acts as a stop which limits the upward motion of the plunger 26 and the contact plate 22. The screw plug is adapted to supply a certain initial pressure on the coil spring 29.

In Figures 1 and 2 is illustrated how the paper is placed between the contact plates 18 and 22 to make a test. The paper is represented by the numeral 32 and the thin sheet of contacting material 33 is placed between a loop of the paper. The measuring instrument is then connected between the metal plate 33 and the body of the contactor and a reading is made of the resistance between these two points. Figure 3 illustrates in detail how the paper 32 is placed over the metal electrode 33.

The operation of my invention is as follows:

As mentioned supra, the paper is doubled over the small suitable flat metal electrode 33 and inserted between the contact plates 18 and 22 while the contactor is in the open position as shown in Figure 1. The handle 12 is then moved 180 degrees to the closed position as indicated in Figure 2. This turns the cam 13 180 degrees as well and thereby moves the plunger 19 and the contact plate 18 down toward the contact plate 22 until the plunger 19 reaches its extremity. The plunger 26 is adjusted in such a manner that at this point the plunger 26 with contact plate 22 has been moved downward a slight amount, thus floating on the pressure of the coil spring 29. Due to the adjustment of this spring and due to the small motion of the loaded spring, this contact pressure is always substantially constant. A vacuum tube voltmeter calibrated for high resistance readings is then connected between the body of the contactor 16 and the metal plate 33 and the resistance is read in the usual manner. Inasmuch as the meter usually is calibrated in advance and a comparison method is used, the magnitude of the resistance immediately indicates the amount of moisture present.

It is understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A non-insulated contactor of the character described, comprising a C-shaped body member; a slidable plunger mounted in one end of said body member, said plunger having a cylindrical disc at its inner end; an eccentric cam rotatably mounted at right-angles to said slidable plunger and in operational engagement with the outer end of same; a lever fastened in said eccentric cam whereby same may be rotated; a second first plunger and in axial alignment with same; slidably mounted in an opposing position to said first plunger and in axial alignment with same; adjustable spring loading means associated with said second plunger; a contacting electrode placed between said cylindrical discs, said contacting electrode being insulated on both sides from said plungers by a fibre to be tested, and electrical connections tying said electrode and said plungers to a sensitive resistance indicating circuit whereby the moisture content of the fibre to be tested can be read in terms of electrical resistance.

RAYMOND S. HART.

REFERENCES CITED

The following references are of record in the file of this patent:

UNITED STATES PATENTS

| Number | Name | Date |
| --- | --- | --- |
| 1,915,028 | Meyer-Jagenberg | June 20, 1933 |
| 2,012,762 | Kern | Aug. 27, 1935 |
| 2,047,638 | Kott | July 14, 1936 |
| 2,063,840 | Fairchild et al. | Dec. 8, 1936 |
| 2,082,364 | Store | June 1, 1937 |
| 2,290,574 | Shafer | July 21, 1942 |
| 2,457,669 | Hart | Dec. 28, 1948 |